May 24, 1955 P. J. NEELY 2,708,886
COUPLING
Filed July 29, 1949 2 Sheets-Sheet 1
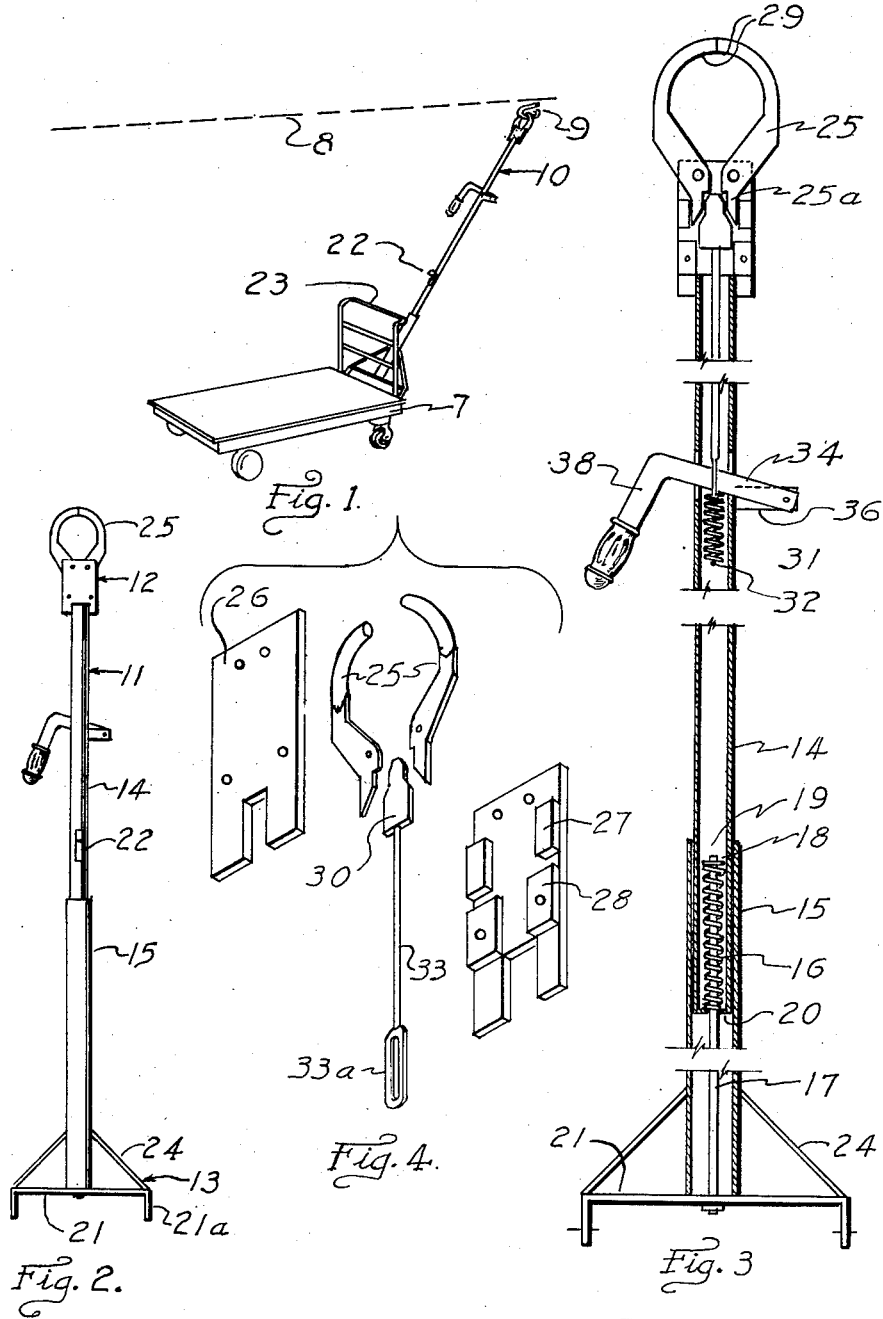
PALACE J. NEELY
INVENTOR.
BY *Browning & Simms*
ATTORNEYS

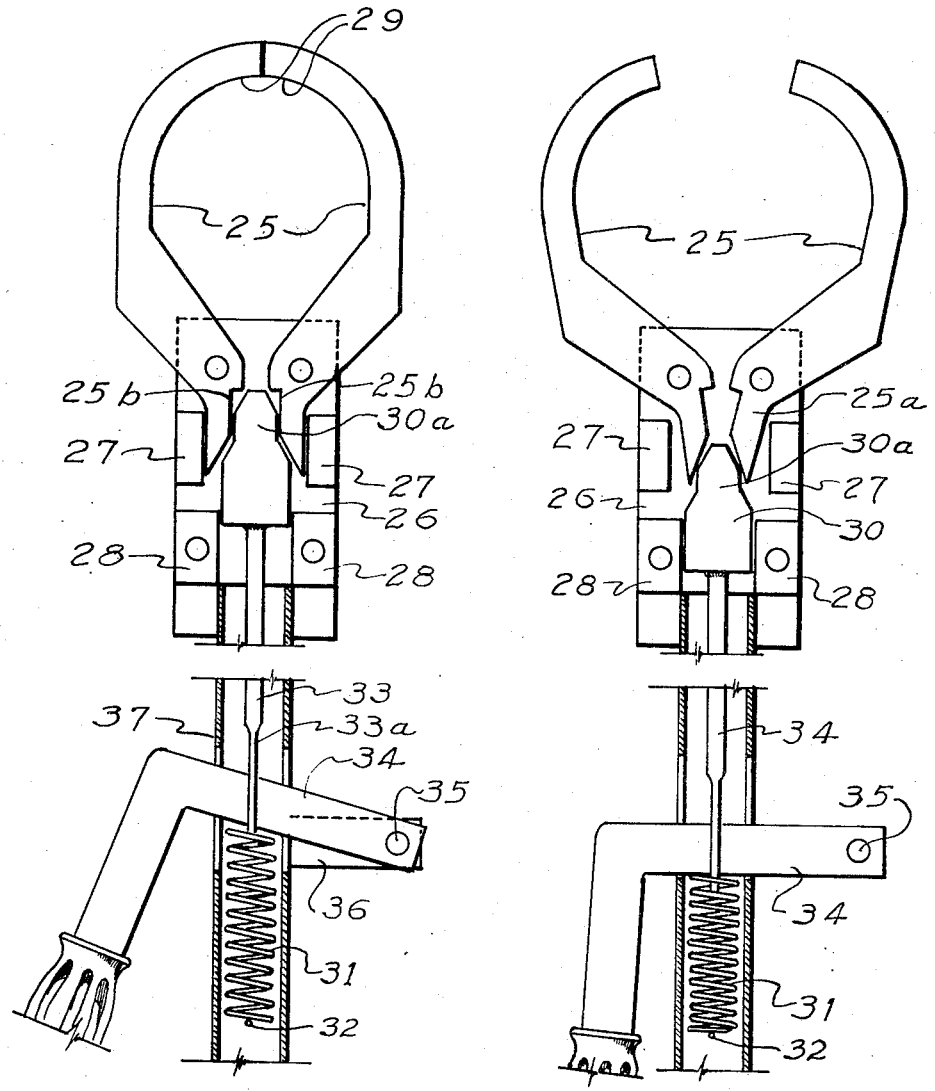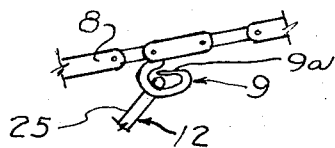

United States Patent Office 2,708,886
Patented May 24, 1955

2,708,886

COUPLING

Palace J. Neely, Houston, Tex., assignor, by mesne assignments, to Campbell Williamson Company, Incorporated, Shreveport, La., a corporation of Louisiana Application July 29, 1949, Serial No. 107,532

5 Claims. (Cl. 104—170)

This invention relates to improvements in couplings and refers more particularly to couplings especially adaptable for releasably securing a trailer, truck, dolly, sled or the like to the hook or other catch element of a conveyor.

It has heretofore been the practice in conveying parts to work benches in shops and in unloading and loading freight or the like, particularly of less than box-car lots, to convey the material from one position to another upon carrier units as trailers, trucks or dollies which are powered by an endless conveyor, such as, for example, a conveyor chain having a plurality of hooks upon which the mast arm or coupling of the trailers or the like may be secured. The systems have not been entirely satisfactory in service primarily because of the difficulties encountered when securing the trailers to the conveyor hooks and when releasing them from the conveyor hooks. In service, the conveyor hooks usually move along at a uniform rate and the mast arm of a carrier unit to be secured to the conveyor is merely placed in position to be engaged by the hook as it passes by and this engagement frequently jerks the carrier unit from underneath the freight and also subjects the trailer carrier unit and conveyor system to considerable shock and jolt. When the trailer is to be released from the constantly moving trailer hook, it is necessary to push the trailer somewhat faster than the hook in order to release the coupling.

An object of this invention is to provide an improved coupling adapted to substantially reduce the difficulties heretofore encountered when connecting or disconnecting a carrier unit to a conveyor hook or the like.

Another object is to provide an improved coupling of the character described having shock absorbing means for reducing the jar and jolt to which the trailer is subjected when coupled to a moving hook.

A further object is to provide a coupling of the class described wherein a carrier unit may be selectively released from a conveyor at any point along its route of travel without the necessity of moving the carrier unit faster than the conveyor hook.

Other and further objects of this invention will appear as the description proceeds.

In the accompanying drawings which form a part of the instant specification, are to be read in conjunction therewith, and wherein like reference numerals are used to indicate like parts in the various views:

Fig. 1 is a schematic view of a trailer secured to a conveyor by a coupling embodying this invention;

Fig. 2 is an elevational view of the coupling shown in Fig. 1;

Fig. 3 is an elevational view in section and upon an enlarged scale of the coupling shown in the previous figures;

Fig. 4 is an exploded view, upon an enlarged scale, illustrating the catch mechanism of the coupling;

Fig. 5 is a sectional view upon an even larger scale showing the catch mechanism of the coupling in closed position;

Fig. 6 is a view similar to Fig. 5 but illustrates the catch mechanism in open position; and Fig. 7 is a view upon an enlarged scale illustrating the details of an improved hook for a conveyor chain.

Referring to the drawings, a trailer, truck, dolly or the like is shown at 7 coupled to an over-head continuous link chain propeller 8 by a hook 9 carried by the propeller chain and a coupling designated generally at 10. Of course, the invention is equally applicable where the propeller chain underlies the track of the carrier unit.

Referring to the details of the coupling, it will be seen to comprise a mast arm 11, a catch mechanism 12 and fastening means 13 by which the coupling may be connected to a truck or trailer.

The mast part or mast arm of the coupling preferably is made up in a plurality of sections 14 and 15 which may be tubular and joined together in telescoping relation with a resilient element, as spring 16, arranged to urge the sections in a direction to shorten the mast arm. The mounting of the spring 16 may be provided by a rod 17 having a washer 18 secured to its upper end by a nut 19. The spring 16 resides between washer 18 and the partially closed end 20 of section 14 of the mast arm. The other end of rod 17 may be secured to yoke 21 as shown in Fig. 3. Preferably rod 17 is out-of-round, as for instance, square in cross-section, and extends through an opening in the end 20 of section 14 and an opening in yoke 21 which are correspondingly shaped. This provides a means for preventing relative rotation of the parts 14 and 15 of the mast arm whereby the catch mechanism 12 will be held in proper position to receive the hook of the link conveyor.

The mast arm may carry a latch part 22 adapted to engage the cross bar 23 carried by the upright end board of truck 7. This will hold the mast arm in raised or out-of-the-way position when the truck is at rest. Preferably, the latch 22 is positioned on the mast arm so that with the latch engaging the bar 23, the catch mechanism will not be in position to be accidentally engaged by a hook or the like carried by the conveyor 8.

The mast arm has fastening means positioned at one end whereby the mast may be secured to the trailer 7. The fastening means may include the cross-piece 21 having angular extensions 21a with perforations for receiving a pin which may be passed through apertured ears extending from the front end of truck 7 but which, in the interest of simplicity, have been omitted from the drawings. The rod 21 may be braced against section 15 of the mast arm by diagonal members 24.

The connection between the mast arm and conveyor preferably is such that it may readily be released so one of the catch parts between the two is made releasable and it is desirable to make the releasable part upon the mast arm. Referring to the catch mechanism 12, it may be arranged so as to provide a divisible loop or other releasable catch element, and this may be accomplished by pivoting two crab claw hooks 25 between plates 26. One of the plates 26 may have spacer lugs 27 and 28 secured thereto, as by welding, to provide ample space for the jaws 25 to move between the plates 26.

The crab claw hooks or jaws 25, when swung to position shown in Figs. 3 and 5 with their outer ends in abutment, provide a divisible loop having a concave bearing surface 29 which is divided substantially at its center by the ends of the hooks. This concave bearing surface 29 is engageable by the hook 9 and when the loop is divided, the hook is readily released.

Provision is made for means to selectively lock the jaws 25 in loop-forming position. This means may include a lock part 25a formed on each of the hooks 25 with confronting tapered surfaces at the ends of the lock parts which provide a guide in the way provided between the lock parts by surfaces 25b of each of the parts. A lock element or part 30 is slidable between the plates 26 and the parts 28. Element 30 has a tapered nose portion 30a adapted to move into the way provided between surfaces 25b of the claw hooks to swing the claw hooks into loop forming position and lock them in this position.

To provide for manipulation of the lock part 30 so as to selectively govern the position of the claw hooks 25, a resilient means is provided normally urging the part 30 toward locking position. This resilient means may include a spring 31 within section 14 of the mast arm, abutting a stop pin 32 having its other end fastened to a connecting rod 33 to which part 30 is secured. Rod 33 preferably has an eye 33a formed therein through which actuator rod 34 extends. The end of actuator rod 34 is pivoted at 35 to a bracket 36 carried by the mast arm and extends through slots 37 formed in the mast arm. The actuator may carry a hand grip 38 and with this arrangement, it is believed obvious that depression of the actuator 34 will lower rod 33 to retract lock element 30 from between the locking parts of the crab claw hooks. Then release of the hand grip 38 will permit the spring 31 to return the locking element 30 into locking position relative to the lock parts 25a of the claw hooks.

A novel hook 9 is shown in Fig. 7 having a part 9a which prevents latch 12 from being accidentally released.

It is thought that the operation of this invention is apparent from the foregoing description. The coupling is secured to carrier unit 7 by suitable pins passing through the extensions 21a of bar 21 and the apertures of the ears carried by the truck. With this arrangement, the mast arm is free to pivot in front of the trailer from a position with hook 22 resting on cross bar 23 to a position where the end of the mast arm rests against the ground or floor upon which the truck is to move. When in a position of rest with the latch 22 resting on the cross bar 23, the divided loop provided by hooks 25 is in an out-of-the-way position so as not to be accidentally engaged by a latch part carried by the conveyor 8.

When the truck 7 is to be moved, the mast arm is manually extended to bring the divided loop into position to be engaged by the hook 9. Upon engagement of the hook with the bearing surface 29, the mast arm will be further extended but the spring 16 cushions the jolt.

The trailer 7 is then carried to a new position by the conveyor 8 and when the trailer is to be released from the conveyor, the operator grasps the hand grip 38 and depresses the actuator 34, which lowers rod 33 and withdraws part 30 from locking position relative to the lock parts 25a of claw hooks 25. The hook 9 bearing against the concave bearing surface 29 causes the jaws to quickly open permitting release of the hook from the loop. When the handle 38 is released by the operator, spring 31 returns the lock part to place the claw hooks back in loop-forming position. If the trailer is to be placed in rest, the mast arm is then placed in an out-of-the-way position against bar 23 with the latch 22 holding it in this position.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A coupling adaptable for releasably securing a carrying unit to a moving conveyor hook or the like comprising a mast arm connectable to a trailer, claw hook elements mounted at one end of the mast arm for swinging movement, the jaws of said claw hook elements extending externally of the mast arm, a detent mechanism having a part movably carried by the mast arm operable in one position to co-act with parts carried by the claw hook elements to move the hook elements from an open position wherein the elements can be passed around the conveyor hook to a predetermined closed relative position to provide a closed loop, said detent part movable to another position to permit swinging of the hook elements to said open position and a resilient element urging the detent part toward the first position operative to return the detent part to the first position from the second position when no external forces are being applied.

2. A coupling adaptable for releasably securing a trailer to a moving propelling chain or the like comprising a mast arm connectable to a trailer, two pivoted crab claw hooks mounted on the mast arm with the ends of the hooks adapted to abut to provide a divisible loop exterior of the mast arm, an eccentric part carried by each jaw, lock means movably carried by the mast arm, said means having surfaces adapted to be moved into locking engagement with the eccentric parts to move the hooks into loop-forming positions and in another position of the lock means permitting movement of the hooks on their pivots to divide the loop whereby the closed loop may be placed in the path of travel of an oncoming propelling chain hook or the like for engagement therewith and disengagement may be accomplished by said means, and a resilient element urging the lock part toward hook locking position, said element operative to positively return the lock part to hook locking position when no external forces are being applied.

3. A coupling adaptable for releasably securing a trailer to a moving hook or the like comprising a variable length mast arm connectable to a trailer, two crab claw hooks mounted on and extending exteriorly of the mast arm, a latch part carried by the mast arm operable to engage the hooks while in open position and then to move the claw hooks to loop-forming position and to hold the hooks in such loop-forming position, means operable to return the latch part to a position holding the claw hooks in loop-forming position, whereby the closed loop may be placed in the path of travel of an oncoming hook or the like for engagement therewith and disengagement may be accomplished by actuation of said means, and means mounted on said mast arm providing a decrease in the rate of acceleration of the end of said mast arm connectable to a trailer when the closed loop is engaged by a moving hook or the like whereby the rate of acceleration from rest of the trailer or object to be pulled by the mast arm will be decreased.

4. A coupling adaptable for releasably securing a carrying unit to a moving hook or the like comprising, a mast arm connectable to a trailer, claw hooks mounted at one end of the mast arm for swinging movement between a closed position to provide a closed loop and an open position wherein the claw hooks can be passed around the moving hook, the jaws of said claw hooks extending externally of the mast arm, actuating parts carried by each of said hooks, a detent mechanism having a part movably carried by the mast arm operable in one position to engage said actuating parts of the hooks to move the hooks from said open to said closed position, said detent part being movable to another position to permit swinging of the hook elements to said open position, an actuator rod engageable with said detent mechanism, said rod carried by the mast and movable with respect thereto and a resilient element urging the detent part towards the first position and operative to return the detent part to the first position from the second position when no external forces are being applied.

5. A coupling adaptable for releasably securing a trailer to a moving hook or the like comprising, a mast arm connectable to a trailer, cooperating claw hooks mounted on the mast arm and extending exteriorly thereof for engaging a hook, cam surfaces on each of said hooks, a detent part engageable with said cam surfaces to maintain said hooks in closed position to provide a closed loop, release means for operating said detent part to permit the elements to move to an open position wherein the claw hooks can be passed around a moving hook, said cam surfaces having portions engageable by said detent part to move the hooks to said closed position and resilient means operable to return said detent part into engagement with said cam surface portions to close said hooks when no external forces are being applied to said release means.

References Cited in the file of this patent

UNITED STATES PATENTS

| Number | Name | Date |
|---|---|---|
| Re. 15,443 | Arndt | Sept. 5, 1922 |
| 820,383 | Ashland | May 15, 1906 |
| 1,312,417 | Mosher | Aug. 5, 1919 |
| 2,022,186 | Butler | Nov. 26, 1935 |
| 2,350,999 | Beirise | June 13, 1944 |
| 2,356,920 | Drescher | Aug. 29, 1944 |
| 2,442,682 | Frieder et al. | June 1, 1948 |

FOREIGN PATENTS

| Number | Country | Date |
|---|---|---|
| 602,619 | Germany | Sept. 12, 1934 |